US012700917B2

(12) United States Patent
Wang et al.

(10) Patent No.: US 12,700,917 B2
(45) Date of Patent: Aug. 4, 2026

(54) SYSTEM FOR SATELLITE DATA TRAFFIC SHAPING

(71) Applicant: AMAZON TECHNOLOGIES, INC., Seattle, WA (US)

(72) Inventors: Dandan Wang, Lynnwood, WA (US); Daniel Todd Cohn, Bainbridge Island, WA (US); Arunabha Ghosh, Bellevue, WA (US); Anil Rao, Redmond, WA (US); Andrew B. Dickinson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 291 days.

(21) Appl. No.: 18/542,026

(22) Filed: Dec. 15, 2023

(65) Prior Publication Data

US 2025/0202573 A1     Jun. 19, 2025

(51) Int. Cl.
H04B 7/185 (2006.01)

(52) U.S. Cl.
CPC ..... H04B 7/18513 (2013.01); H04B 7/18519 (2013.01)

(58) Field of Classification Search
CPC ......... H04W 72/1263; H04W 28/0268; H04W 28/0257; H04W 28/24; H04W 28/26; H04L 47/10; H04L 47/215; H04B 7/18513; H04B 7/18519
See application file for complete search history.

(56) References Cited

U.S. PATENT DOCUMENTS

| | | | | |
|---|---|---|---|---|
| 8,862,732 B2 * | 10/2014 | Bernstein | ................ | H04L 47/10 |
| | | | | 709/227 |
| 9,876,682 B2 * | 1/2018 | Bernstein | ............ | H04L 41/0896 |
| 11,595,113 B1 * | 2/2023 | Dickinson | .............. | H04B 7/195 |
| 2007/0208864 A1 * | 9/2007 | Flynn | .................... | H04L 69/329 |
| | | | | 709/227 |

(Continued)

OTHER PUBLICATIONS

Ju et al. ("Congestion Control by Traffic Shaping for Ground/Satellite Network"), MILCOM 97 MILCOM 97 Proceedings, 1997 (Year: 1997).*

(Continued)

*Primary Examiner* — Dung Hong
(74) *Attorney, Agent, or Firm* — Athorus, PLLC

(57) ABSTRACT

A constellation of satellites provides communication services to user terminals (UTs). Downstream data addressed to a UT is received at a point-of-presence (POP) and tokenized before sending to a satellite serving the UT. Tokens are associated with resource blocks (RBs), each RB indicative of a particular combination of downlink frequency and timeslot. Tokens are then allocated to downstream data. This tokenized downstream data is sent to the satellite. Untokenized downstream data may be buffered for later tokenization or discarded. A satellite may use information in the token to schedule transmission on a downlink to the UT. The supply of tokens may be based on shaper input data such as gateway queue depth, estimated latency from the POP to the satellite, estimated time to empty a buffer onboard the satellite, and so forth. The supply of tokens may be adjusted to minimize data loss during handovers from one satellite to another.

20 Claims, 8 Drawing Sheets

(56)　　　　　References Cited

U.S. PATENT DOCUMENTS

2014/0369205 A1* 12/2014 Bernstein ........... H04L 47/2458
370/235.1
2023/0269728 A1* 8/2023 Jaegal ............... H04W 72/1263
370/329

OTHER PUBLICATIONS

"Token Bucket", Wikipedia, 4 pgs. Retrieved from the Internet on
Nov. 24, 2023: URL: https://en.wikipedia.org/wiki/Token_bucket.
Florou Radaella, "Patent Cooperation Treaty International Search
Report and Written Opinion dated Mar. 17, 2025", Patent Coop-
eration Treaty Application Number PCT/US24/59021, Patent Coop-
eration Treaty, Mar. 17, 2025.

* cited by examiner

FIG. 1

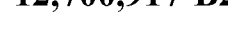

200

SATELLITE 102

STRUCTURAL SYSTEM 202

CONTROL SYSTEM 204

FLIGHT CONTROL PROCESSOR(S) 220

TRACKING, TELEMETRY, CONTROL SYSTEM 222

POWER MANAGEMENT AND DISTRIBUTION (PMAD) SYSTEM 224

POWER SYSTEM 206

PHOTOVOLTAIC ARRAY(S) 230

PV ARRAY ACTUATOR(S) 232

BATTERY(S) 234

MANEUVERING SYSTEM 208

REACTION WHEEL(S) 240

THRUSTER(S) 242

MAGNETIC TORQUE ROD(S) 244

BUS(ES) 216

SENSOR(S) 210

ENGINEERING CAMERA(S) 250

ACCELEROMETER(S) 252

GYROSCOPE(S) 254

GNSS 256

STAR TRACKER(S) 258

COARSE SUN SENSOR 260

COMMUNICATION SYSTEM 212

PROCESSOR(S) 292

LINK MODULE 268

TRANSMIT SCHEDULER 178

INTERSATELLITE LINK FPGA(S) 270

ISL TRANSCEIVER(S) 272

COMMUNICATION FPGA(S) 274

MODEM(S) 276

DOWNLINK TRANSMITTER(S) 278

UPLINK RECEIVER(S) 280

ANTENNA(S) 282

PULSE PER SECOND SYSTEM 214

| Sub-spot ID 332 | Buffer 334 | Mod/Cod Index 336 | RB equivalents 338 |
|---|---|---|---|
| 1 | {BUFFERED DATA 1},{TOKENS1} | 2 | 13 |
| 2 | {BUFFERED DATA 2},{TOKENS2} | 1 | 27 |
| 3 | {BUFFERED DATA 3},{TOKENS3} | 3 | 9 |
| ... | ... | ... | ... |

Satellite
102(1)

Sub-Beams
310
(At a given time)

Low throughput
312

High throughput
314

F1    F3    F4    F5    Fn

F2

Sub-
Spot
302

Sub-
Spot
302(S)

1    2    3    4    ...    S

UT
108(1)

UT
108(T)

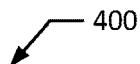
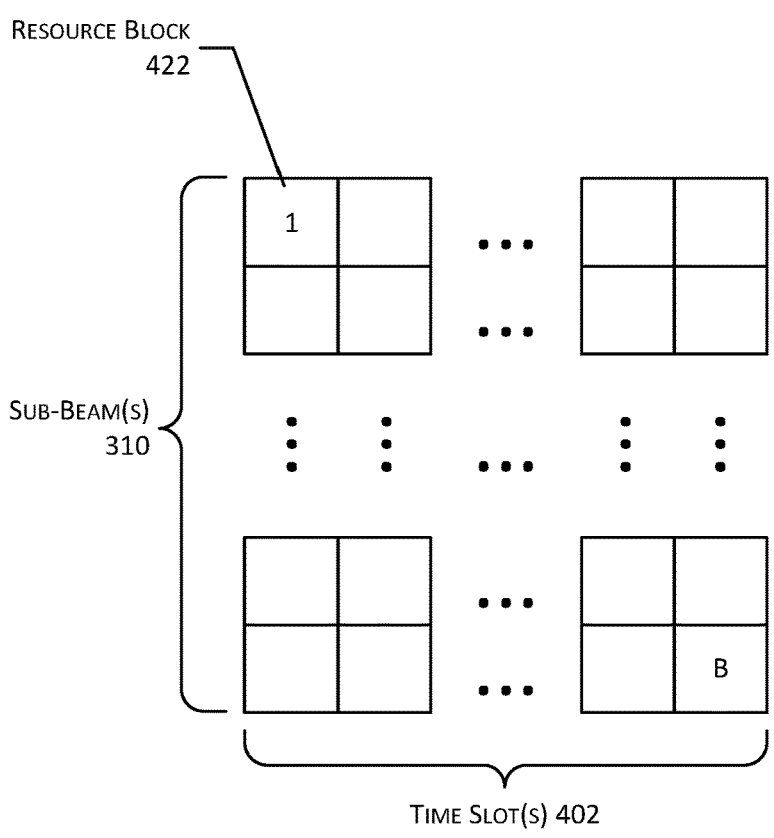
FIG. 4

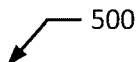

500

SHAPER INPUT DATA <u>172</u>

GATEWAY STATUS DATA <u>502</u>

MOD/COD PER GATEWAY LINK <u>520</u>

GATEWAY QUEUE DEPTH DATA <u>522</u>

MANAGEMENT SYSTEM DATA <u>504</u>

SAT-UT TIME OF FLIGHT LATENCY <u>532</u>

HANDOVER TIME <u>534</u>

UT TO SUB-SPOT ASSOCIATION DATA <u>536</u>

SUB-SPOT TO TRANSMIT MODEM ASSOCIATION DATA <u>538</u>

TRANSMIT MODEM TO SATELLITE ASSOCIATION DATA <u>540</u>

SUB-BEAM TO SUB-SPOT ASSIGNMENT DATA <u>542</u>

GATEWAY TO SATELLITE ASSOCIATION DATA <u>544</u>

GATEWAY TO SATELLITE TIME OF FLIGHT LATENCY <u>546</u>

...

SATELLITE STATUS DATA <u>506</u>

MOD/COD INDEX (E.G. DOWNLINK OF EACH UT) <u>336</u>

BUFFER QUEUE DEPTH <u>572</u>

INTERSATELLITE LINK AVAILABILITY <u>574</u>

...

POP STATUS DATA <u>508</u>

ESTIMATED POP-GW LATENCY DATA <u>580</u>

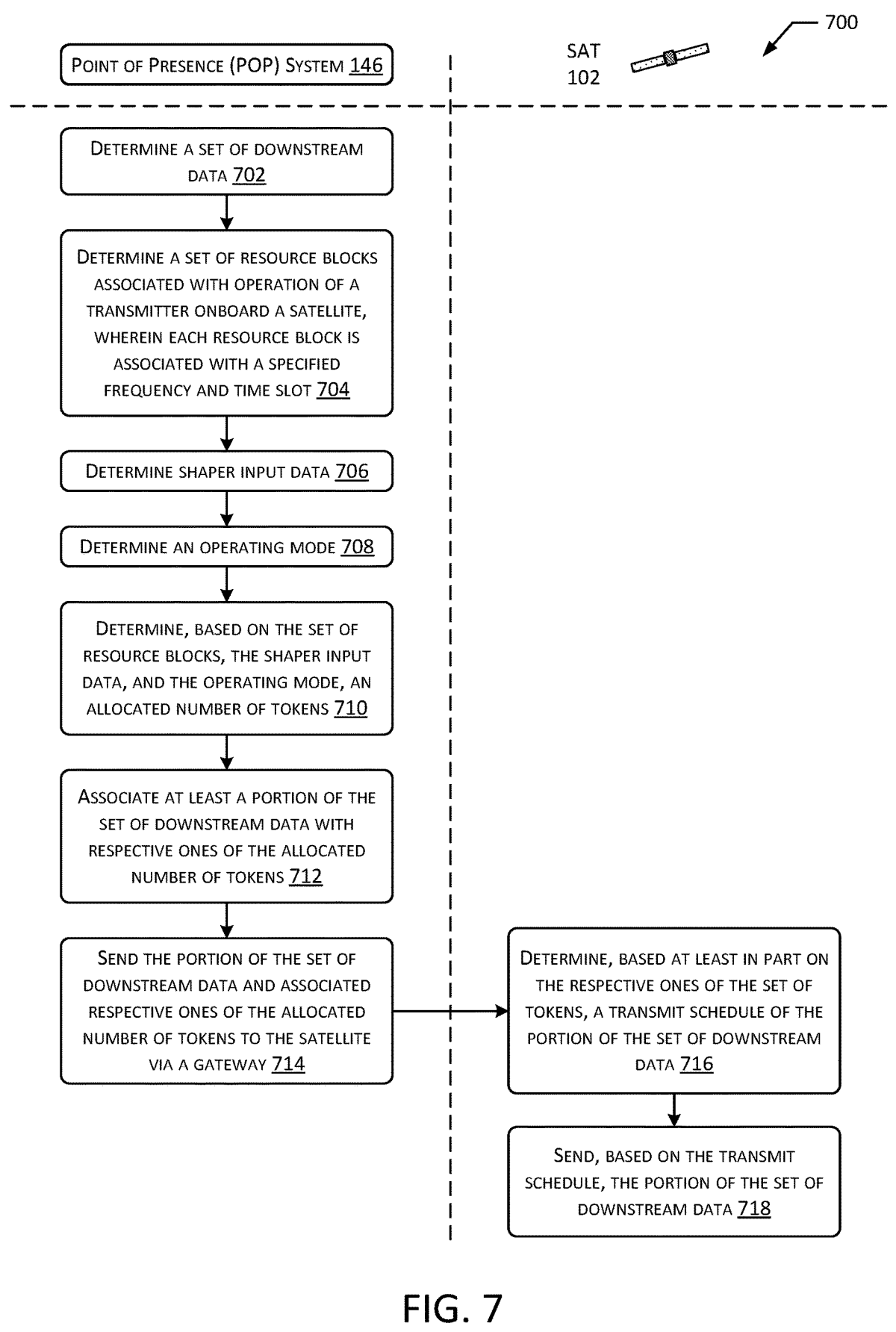

SAT
102

| POINT OF PRESENCE (POP) SYSTEM 146 |
| --- |

DETERMINE A SET OF DOWNSTREAM
DATA 702

DETERMINE A SET OF RESOURCE BLOCKS
ASSOCIATED WITH OPERATION OF A
TRANSMITTER ONBOARD A SATELLITE,
WHEREIN EACH RESOURCE BLOCK IS
ASSOCIATED WITH A SPECIFIED
FREQUENCY AND TIME SLOT 704

DETERMINE SHAPER INPUT DATA 706

DETERMINE AN OPERATING MODE 708

DETERMINE, BASED ON THE SET OF
RESOURCE BLOCKS, THE SHAPER INPUT
DATA, AND THE OPERATING MODE, AN
ALLOCATED NUMBER OF TOKENS 710

ASSOCIATE AT LEAST A PORTION OF THE
SET OF DOWNSTREAM DATA WITH
RESPECTIVE ONES OF THE ALLOCATED
NUMBER OF TOKENS 712

SEND THE PORTION OF THE SET OF
DOWNSTREAM DATA AND ASSOCIATED
RESPECTIVE ONES OF THE ALLOCATED
NUMBER OF TOKENS TO THE SATELLITE
VIA A GATEWAY 714

DETERMINE, BASED AT LEAST IN PART ON
THE RESPECTIVE ONES OF THE SET OF
TOKENS, A TRANSMIT SCHEDULE OF THE
PORTION OF THE SET OF DOWNSTREAM
DATA 716

SEND, BASED ON THE TRANSMIT
SCHEDULE, THE PORTION OF THE SET OF
DOWNSTREAM DATA 718

FIG. 7

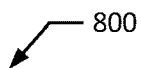

800

DETERMINE A FIRST NUMBER OF TOKENS, WHEREIN EACH TOKEN IS ASSOCIATED WITH A RESPECTIVE RESOURCE BLOCK OF A SET OF RESOURCE BLOCKS OF A FIRST SATELLITE
802

DETERMINE A BUFFER QUEUE DEPTH AT A SATELLITE FOR A SPECIFIED TIME INTERVAL
804

DETERMINE A SECOND NUMBER OF TOKENS BASED ON THE FIRST NUMBER OF TOKENS AND THE BUFFER QUEUE DEPTH
806

DETERMINE AN ESTIMATED TOKEN DRAIN RATE
808

DETERMINE A THIRD NUMBER OF TOKENS BASED ON THE SECOND NUMBER OF TOKENS AND THE ESTIMATED TOKEN DRAIN RATE
810

DETERMINE AN OPERATING MODE 812

DETERMINE A FOURTH NUMBER OF TOKENS BASED ON THE THIRD NUMBER OF TOKENS AND THE OPERATING MODE
814

DETERMINE GATEWAY CAPACITY ASSOCIATED WITH COMMUNICATION TO THE FIRST SATELLITE 816

DETERMINE A FIFTH NUMBER OF TOKENS BASED ON THE FIFTH NUMBER AND THE GATEWAY CAPACITY
818

FIG. 8

SYSTEM FOR SATELLITE DATA TRAFFIC SHAPING

BACKGROUND

A constellation of satellites may provide communication services to many user terminals. Some user terminals may be mobile.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 1 illustrates a satellite system including a tokenized traffic shaper to tokenize downstream data addressed to a user terminal, according to some implementations.

FIG. 2 is a block diagram of some systems associated with the satellite, according to some implementations.

FIG. 4 illustrates resource blocks, according to some implementations.

FIG. 5 illustrates shaper input data, according to some implementations.

FIG. 7 depicts a flow diagram of a process to tokenize downstream data and schedule the tokenized data for transmission on a downlink from a satellite, according to some implementations.

FIG. 8 depicts a flow diagram of a process to determine a number of tokens to use by the traffic shaper module, according to some implementations.

Figure 3:
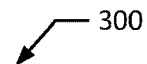
FIG. 3 illustrates sub-beams and sub-spots of a satellite's downlink, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communications system may utilize a constellation of satellites to wirelessly transfer data between user terminals (UTs) and points of presence (POPs) that in turn connect to other networks, such as the Internet. Some of these user terminals may remain stationary during operation, while others are mobile user terminals that change their position over time while maintaining communication with the constellation.

Signals between the UT and the satellite are limited to travelling at the speed of light. The farther away a satellite is from the UT, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth are also present. Such delays, or latency, are undesirable for many types of communication. For example, time-sensitive communication activities such as remote control of devices, industrial reporting and control, gaming, and so forth may be adversely affected by these latencies. In comparison, a hop involving a non-geosynchronous orbit (NGO) satellite at an altitude of 600 km only introduces about 4 ms of latency comprising 2 ms up to the satellite and 2 ms down to the UT. As a result, compared to using geosynchronous satellites, the use of NGO satellites significantly reduces latencies due to signal travel times.

Using a constellation of many NGO satellites offers significant benefits compared to a geosynchronous satellite. Latency is dramatically reduced, improving usefulness for communication. Shorter distances between the UT and the satellite allow for increased UT density by allowing greater frequency re-use and sharing. Power and antenna gain requirements for both the UT and the satellites are also reduced due to the shorter distances compared to communication using geosynchronous satellites. This allows for relatively smaller and less expensive satellites to be used.

The Earth may be divided into "spots" and subdivisions designated as "sub-spots". Each sub-spot may be represented by one or more of a specific geographic area or may be associated with parameters of communication resources that are allocated to provide communication in a "signal footprint" that is within and near those specific geographic areas. The geographic areas may be tessellated and non-overlapping. For example, the surface of the Earth may be divided into hexagonal cells.

In comparison the geographic areas associated with the respective communication resources may differ from the boundaries of those geographic areas. For example, given the parameters of communication resources such as antenna gain, frequency, transmit power levels, co-channel interference, antenna position, antenna direction, and so forth, signal coverage or a "signal footprint" on the Earth may extend beyond the edges of the respective geographic area. In another example, terrain such as high mountains may "shadow" or block coverage and reduce signal coverage to within the edges of the respective geographic area.

Given the relatively short distances and gain provided by antennas on NGO satellites, the overall size of these sub-spots may be relatively small. For example, a sub-spot provided by a geosynchronous satellite may include an area that is thousands of miles on a side. In comparison, a sub-spot provided by an NGO satellite may be tens of kilometers on a side. However, even with the relatively small sub-spot sizes, an NGO satellite may be providing communication services to many UTs within a given sub-spot.

Downstream data that is addressed to a particular UT is received by a point of presence (POP). The POP then forwards that downstream data to a gateway. The gateway in turn sends that downstream data to a satellite that is providing communication service to the UT. The satellite then sends the downstream data, via a transmitter providing a downlink, to the UT. The amount of bandwidth available from the gateway to the satellite, and from the satellite to the UT(s) is limited. Additionally, the bandwidth may vary over time due to factors such as hardware availability, transmitter performance, weather, and so forth. Improper management of the downlink from the satellite to the UT(s) may result in adverse performance such as failure to deliver the down- stream data, latency of delivery exceeding specified maxi- mums, inefficient use of the downlink, and so forth.

Traditional techniques to manage transfer on communi- cation links with finite bandwidth include classification, metering, and so forth. For example, packets of downstream data may be classified to be prioritized during data transfer based on data in their respective packet headers. In another example, metering may be implemented using a token bucket algorithm in which a number of tokens are deter- mined based on the number of bytes allocated to be trans- ferred during an interval of time. Incoming packets are assigned tokens from a supply ("bucket") of tokens contain- ing that number of tokens. Packets that have assigned tokens are forwarded, while packets that do not are either buffered or discarded. However, the traditional techniques result in poor performance when used in an NGO satellite constel- lation. For example, the rate at which downstream data is delivered from a satellite to UTs is variable over time. Given this variability, traditional techniques may result in the satellite having unused bandwidth or having too much data to deliver in a timely manner with the available bandwidth.

Described in this disclosure are systems and techniques to provide a traffic shaper that provides traffic shaping of downstream data for delivery by NGO satellites. The traffic shaper may be executed on hardware on the ground, such as at a point of presence (POP) that accepts downstream data addressed to UTs and provides as output tokenized down- stream data to a satellite. A transmit scheduler onboard the satellite may determine when to schedule transmission of downstream data on a downlink to a UT based at least on the tokens. The traffic shaping may thus be performed on the ground, reducing the complexity of the transmit scheduler and reducing the burden on the more limited and expensive computational resources onboard the satellite.

Downlink communication parameters such as specified frequencies and time slots may be used to specify a set of resource blocks. Each resource block in the set is associated with a particular combination of downlink communication parameters. The downlink communication parameters rep- resent communication resources that may be used to trans- mit downstream data from a satellite to a UT. In one implementation, a set of resource blocks may be specified that designate the combinations of different frequencies and time slots that are associated with operation of a downlink transmitter. For example, each frequency may be associated with a particular sub-beam, with each sub-spot being served using one or more sub-beams.

During operation, the traffic shaper determines a set of resource blocks that are associated with operation of a transmitter onboard a satellite. A first number of tokens may be determined. One token may be associated with each resource block in the set of resource blocks. In one example, there may be a one-to-one correspondence between resource blocks and tokens. In another example, there may be a one-to-many correspondence between resource blocks and tokens. Shaper input data is determined that may include information such as buffer queue depth on the satellite, a round trip latency between the POP where the traffic shaper is executing and the satellite, time until next handover from the satellite to a next satellite, and so forth. The traffic shaper uses the shaper input data to determine an allocated number of tokens. Portions of downstream data may then be associated with tokens from the allocated number of tokens, producing tokenized downstream data. For example, each packet of downstream data may be associated with a token. Downstream data that has an associated token is then forwarded to a gateway that then sends the tokenized data to the satellite. Untokenized downstream data may be buffered for later tokenization and transmission or discarded.

In some implementations a portion of tokens that are allocated for a future time interval may be used during the current time interval and added to the allocated number of tokens. For example, to accommodate a burst of downstream data that would otherwise exceed the number of available tokens and be discarded, tokens associated with a later time may be added to the allocated number of tokens and used.

The traffic shaper may be operated in different operating modes. Each operating mode may be associated with a different maximum number of tokens. For example, the number of resource blocks may be multiplied by a mode factor to determine a maximum number of tokens. The mode factor may vary by mode. The maximum number of tokens may then be adjusted, such as based on the shaper input data, to determine the allocated number of tokens.

While operating the traffic shaper in a scheduler mode, a relatively small mode factor is used, resulting in a relatively small maximum number of tokens. For example, the mode factor may equal 1. Because of the small maximum number of tokens, a limited amount of downstream data is sent to the satellite. As a result, the transmit scheduler onboard the satellite has a relatively small amount of downstream data to schedule.

In comparison, while operating the traffic shaper in a data pipe mode, a relatively large mode factor is used, resulting in a relatively large maximum number of tokens. For example, the mode factor may equal 1000. As a result, the transmit scheduler onboard the satellite has a relatively large amount of downstream data to schedule.

In some implementations the operating mode or mode factor may be determined based on time until a handover. At handover, communication service for a particular UT is transitioned to another sub-spot served by the satellite, spot served by the satellite, or satellite. As the handover approaches, the mode factor may decrease, transitioning from data pipe mode to scheduler mode.

Onboard the satellite, the transmit scheduler may use the tokens to determine how and when the associated portion of data is to be transmitted on the downlink. In implementa- tions in which a token represents a particular resource block, the transmit scheduler may use the token to schedule trans- mission at the frequency and time slot specified by that resource block.

By using this technique of allocating tokens based on resource blocks and using those tokens to determine token- ized data, the system is able to efficiently allocate the downlink communication resources. This provides a sub- stantial improvement in overall throughput, reduces latency associated with delivery of downstream data to UTs, and allows highly efficient use of the downlink from the satellite to the UTs.

Illustrative System

The ability to communicate between two or more loca- tions that are physically separated provides substantial ben- efits. Communications over areas ranging from counties, states, continents, oceans, and the entire planet are used to enable a variety of activities including remote sensing, remote operation of devices, and so forth.

Communications facilitated by electronics use electro- magnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication services. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because the period of the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites is limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies. As a result, the "footprint" of a radio signal emitted from a geosynchronous satellite may cover a vary large area of the Earth. For example, a relatively narrow beam from a geosynchronous satellite's antennas may cover several thousands of square kilometers of the Earth.

Using a geosynchronous satellite to provide communication services also introduces a significant latency or delay because of the time it takes for a signal to travel up to the satellite in geosynchronous orbit and back down to a device on or near the ground. The latency due to signal propagation time of a single hop can be at least 240 milliseconds (ms). This latency can be unacceptable in situations where the data is time sensitive, such as realtime communications or remote control of equipment.

To alleviate these and other issues, satellites in NGOs may be used. The altitude of an NGO is high enough to provide an individual satellite with a coverage of a relatively large portion of the ground, while remaining low enough to minimize latency due to signal propagation time. For example, the lower altitude of the satellite in NGO, compared to a geosynchronous orbit, provides coverage over a much smaller portion of the Earth. The lower altitude also reduces the distance the electromagnetic signal has to travel. For example, the satellite at 600 km only introduces 4 ms of latency for a single hop. Compared to the geosynchronous orbit, the reduced distance of the NGO reduces the dispersion of electromagnetic signals. As a result, the portion of the Earth that is covered by a signal transmitted from the satellite in the NGO, or "footprint", may be much smaller than that of a geosynchronous satellite. For example, a footprint of a signal transmitted by the antenna array of an NGO satellite may be tens of kilometers or smaller on a side, compared to the thousands of kilometers of a spot of an antenna array onboard a geosynchronous satellite. This allows the satellite in NGO as well as the device communicating with the satellite to use a less powerful transmitter, use smaller antennas, and so forth.

The system 100 shown here comprises a plurality (or "constellation") of communication satellites 102(1), 102(2), . . . , 102(S), each communication satellite 102 being in orbit 104. Also shown is a gateway 106, user terminals (UTs) 108, and computing devices 110. Each computing device 110 may execute one or more application modules 198. For example, the application modules 198 may comprise email applications, telephony applications, videoconferencing applications, telemetry applications, remote sensing applications, telecontrol applications, and so forth.

The constellation may comprise hundreds or thousands of satellites 102, in various orbits 104. For example, one or more of these satellites 102 may be in non-geosynchronous orbits (NGOs) in which they are in constant motion with respect to the Earth, such as a low earth orbit (LEO). In this illustration, orbit 104 is depicted with an arc pointed to the right. A first satellite (SAT1) 102(1) is leading (ahead of) a second satellite (SAT2) 102(2) in the orbit 104.

Each satellite 102 may include a transmit scheduler 178. The satellite 102 may include hardware such as one or more processors, transmitters, receivers, antennas, digital signal processors, and so forth. The transmit scheduler 178 may comprise one or more processors executing instructions to manage the hardware and maintain communication service such as a radio communication link with other devices. During operation, the transmit scheduler 178 processes tokenized downstream data 176 to allocate downlink resources during operation to operate the transmitter to send downstream data 142 to the UT 108. The tokenized downstream data 176 is discussed in more detail in with regard to the traffic shaper module 174. The satellite 102 is discussed in more detail with regard to FIG. 2.

The transmit scheduler 178 may determine resource allocation to operate the transmitter, such as timeslot, frequency, and so forth that are allocated to particular spots, sub-spots, and so forth. A spot may be associated with a particular geographic area and the communication resources allocated to that geographic area, and a sub-spot may comprise a geographic area within that spot. In some implementations, the footprint of the spot may extend beyond, or may be within, the geographic area associated with that spot. For example, actual coverage of a signal transmitted by the satellite using the spot may extend beyond the edges of the geographic area.

A ground segment of the system 100 may comprise one or more gateways 106 that are in communication with one or more satellites 102. The gateways 106 may pass data between the satellites 102, a management system 150, point of presence (POP) systems 146, and then associated networks 144 such as the Internet, and so forth. The gateways 106 may be emplaced on land, on vehicles, at sea, and so forth. Each gateway 106 may comprise a communication system 140. Each gateway 106 may use the communication system 140 to establish communication with one or more satellites 102, other gateways 106, and so forth.

The communication system 140 of a gateway 106 may include components similar to those of the communication system of a satellite 102 and may perform similar communication functionalities. For example, the communication system 140 may include one or more modems, digital signal processors, power amplifiers, antennas (including at least one antenna that implements multiple antenna elements, such as a phased antenna arrays), processors, memories, storage devices, communications peripherals, interface buses, and so forth.

The gateways 106 are in communication with a management system 150. The management system 150 is also in communication, via the gateways 106, with the satellites 102 and the UTs 108. The management system 150 coordinates operation of the satellites 102, gateways 106, UTs 108, and other resources of the system 100. The management system 150 may comprise one or more of an orbital mechanics system 152 or a scheduling system 156. The management system 150 may comprise one or more servers or other computing devices.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts position, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data 164 that indicates when communication is to be transferred from a first spot to a second spot, from a first sub-spot to a second sub-spot, or from a first satellite to a second satellite. An intrasatellite handover occurs when the first and second spots (or sub-spots) are provided with communication service by the same satellite 102. An intersatellite handover occurs when the first and second spots (or sub-spots) are provided with communication services by different satellites. The management system 150 may send data to the associated satellites 102 to facilitate the handover.

The scheduling system 156 may also specify in the handover data 164 communication parameters such as frequency, timeslot indicative of when transmission is permitted, and so forth. During operation, the scheduling system 156 may use information such as the orbital data 154, system status data 158, user terminal data 160, and so forth.

The system status data 158 may comprise information such as which UTs 108 are currently transferring data, satellite availability, current satellites 102 in use by respective UTs 108, capacity available at particular gateways 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of data. In another example, the system status data 158 may be indicative of future status, such as a satellite 102 being unavailable to provide communication service due to scheduled maneuvering, scheduled maintenance, scheduled decommissioning, and so forth.

The user terminal data 160 may comprise information such as a geographic position (geolocation) of a particular UT 108. The user terminal data 160 may also include other information such as a current operating mode, priority assigned to data associated with that UT 108, a type or category of UT that is indicative of the communication capabilities of that particular UT 108, and so forth. For example, a first UT 108(1) may be a first category of device that has more powerful transmitters, backup power supply, and so forth and that is used at a business. Continuing the example, a second UT 108(2) may be in a second category of device, using less expensive and less powerful transmitters, omitting the backup power supply, and used at a residence. The user terminal data 160 may also include information such as a priority allocation associated with a particular UT 108. For example, the first UT 108(1) may be assigned a higher priority relative to the second UT 108(2). Over time, different versions, types, or categories of UTs 108 may be deployed, having different communication capabilities such as being able to operate at particular frequencies, supporting different signal encoding schemes, having different antenna configurations, and so forth.

The handover data 164 is indicative of information such as a UT identifier indicative of a particular UT 108, a handover time indicative of when a handover is to occur, a next satellite identifier (ID) that is indicative of the next satellite 102 that will be providing communication service to the specified UT 108, and so forth. The handover data 164 facilitates an orderly transition of the UT 108 from a first satellite 102(1) to a second satellite 102(2). The scheduling system 156 may determine handover data 164 at regular intervals. For example, handover data 164 may be generated for handover assessment intervals that are 60 seconds long.

The UT 108 includes a communication system 180 to establish communication with one or more satellites 102 and transfer data. The communication system 180 may comprise a network interface. The UT 108 passes data between the constellation of satellites 102 and the computing device 110. The computing device 110 may execute one or more application modules 198. The data transferred includes upstream data 112 sent by the computing device 110 or downstream data 142 that is addressed to the UT 108 or the computing device 110. For example, during operation the application module 198 may send upstream data 112 and receive downstream data 142. The upstream data 112 and the downstream data 142 each may comprise header data and payload data. The UT 108 may be fixed or in motion. For example, the UT 108 may be used at a residence, business, or on a vehicle such as a car, boat, aerostat, drone, airplane, remotely operated vehicle, uncrewed vehicle, and so forth.

During operation, the communication system 180 may utilize one or more of the handover data 164 or grant data received from the satellite 102. For example, the communication system 180 may use the handover data 164 that is received to perform a handover from a first spot to a second spot. In another example, the UT 108 may request uplink resources to send the upstream data 112. Responsive to the request, the satellite 102 may send grant data allocating uplink resources for the UT 108 to use to send the upstream data 112 to the satellite 102.

The communication system 180 of the UT 108 may include components similar to those of the communication system of a satellite 102 and may perform similar communication functionalities. For example, the communication system 180 may include one or more modems, digital signal processors, power amplifiers, antennas (including at least one antenna that implements multiple antenna elements, such as a phased antenna array), processors, memories, storage devices, communications peripherals, interface buses, and so forth. Continuing the example, the network interface may comprise the communication system 180.

The UT 108 includes a tracking system 182. The tracking system 182 uses ephemeris data 184 to determine tracking data 186. The ephemeris data 184 provides information indicative of orbital elements of the orbit 104 of one or more satellites 102. For example, the ephemeris data 184 may comprise orbital elements such as "two-line element" data for the satellites 102 in the constellation that are broadcast or otherwise sent to the UTs 108 using the communication system 180.

The tracking system 182 may use the current position data indicative of the current position of the UT 108 with high accuracy and the ephemeris data 184 to determine the tracking data 186 for the satellite 102. For example, based on the current position of the UT 108 and the predicted position and movement of the satellites 102, the tracking system 182 is able to calculate the tracking data 186. The tracking data 186 may include information indicative of azimuth, elevation, distance to the second satellite 102(2), time of flight correction, or other information associated with a specified time. The determination of the tracking data 186 may be ongoing. For example, the first UT 108 may determine tracking data 186 every 100 ms, every second, every five seconds, or at other intervals.

Figure 1:
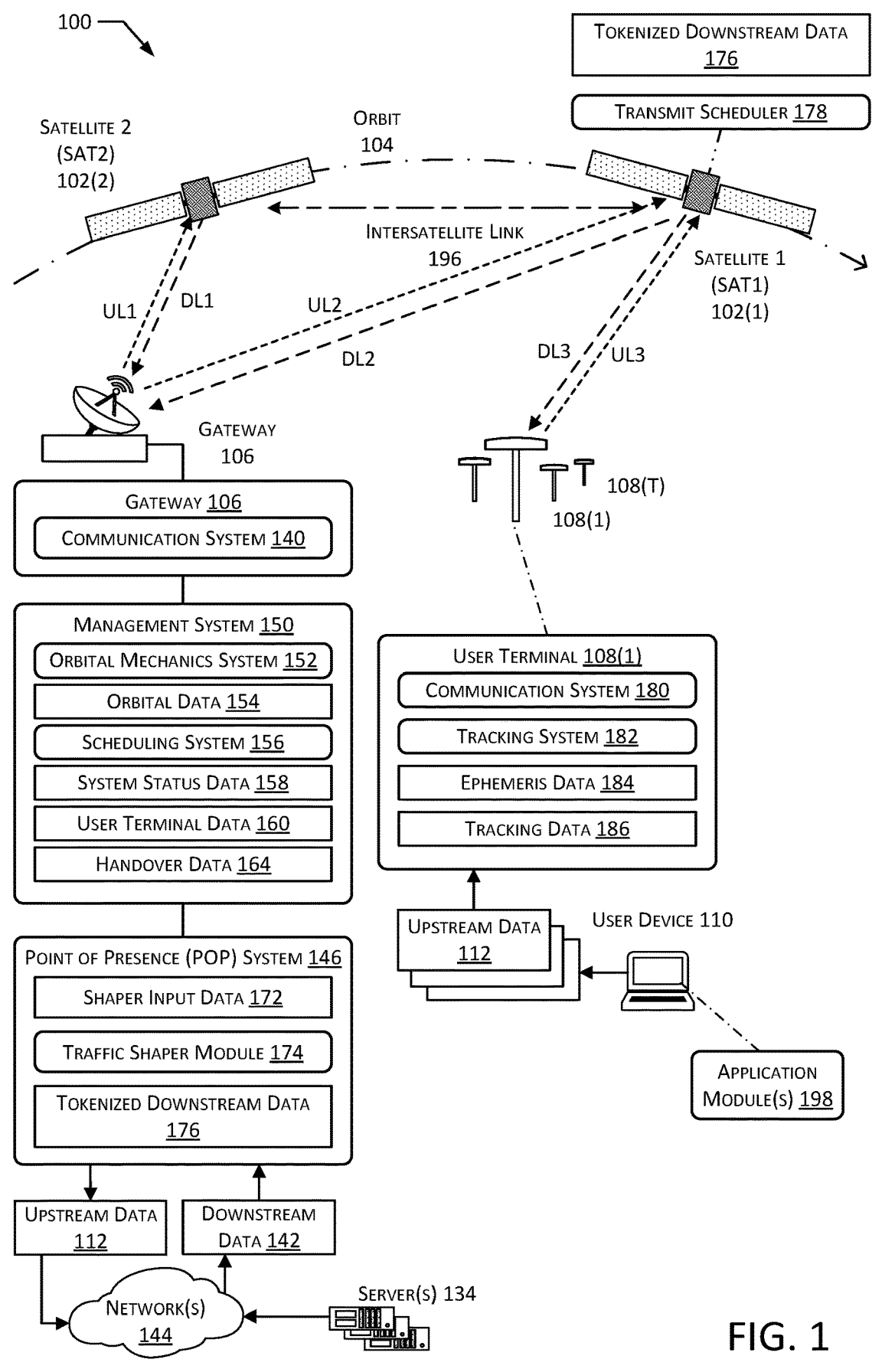

With regard to FIG. 1, the uplink is a communication link which allows data to be sent to a satellite 102 from a gateway 106, UT 108, or device other than another satellite 102. Uplinks are designated as UL1, UL2, UL3 and so forth. For example, UL1 is a first uplink from the gateway 106 to the second satellite 102(2). In comparison, a downlink is a communication link which allows data to be sent from the satellite 102 to a gateway 106, UT 108, or device other than another satellite 102. For example, DL1 is a first downlink from the second satellite 102(2) to the gateway 106.

In some implementations, the satellites 102 may also be in communication with one another. For example, an inter-satellite link (ISL) 196 may provide for communication between satellites 102 in the constellation. In some implementations, the ISL 196 may be used to exchange information between satellites 102 to determine handover data 164, coordinate the handovers of a UT 108(T), and so forth.

The UT 108 may send upstream data 112 using the system 100. For example, the upstream data 112 may originate from the UT 108 or may be received by the UT 108 from the computing device 110. The upstream data 112 may comprise a single packet or other unit of data transfer, or a plurality of packets or other units of data transfer. The upstream data 112 may be addressed to a device. The device that the upstream data 112 is addressed to may be accessible using one or more networks 144, such as the Internet.

Gateways 106 may have more substantial communication infrastructure, such as uplink transmitters with greater power than a UT 108, antennas with greater gain than a UT 108, sites that provide clear line of sight from horizon to horizon, and so forth. A gateway 106 may be in communication with a plurality of satellites 102 at a time. In some implementations, the gateway 106 may implement the traffic shaper module 174 as described herein.

The system 100 may include one or more point of presence (PoP) systems 146. Each PoP system 146 may comprise one or more servers or other computing devices. Separate PoP systems 146 may be located at different locations. In one implementation, a PoP system 146 may be associated with providing service to a plurality of UTs 108 that are located in a particular geographic region.

The PoP systems 146 may manage communication between the system 100 and the network 144. For example, a first PoP system 146 may receive the upstream data 112 and send that upstream data 112 to the network 144. In another example, the first PoP system 146 may receive the downstream data 142 and proceed to attempt delivery of the downstream data 142 to the UT 108.

The PoP system 146 is in communication with one or more gateways 106(1), 106(2), . . . , 106(G) and the management system 150. In some implementations one or more functions may be combined. For example, the PoP system 146 may perform one or more functions of the management system 150. In another example, the PoP system 146 may be included in an integrated gateway 106.

The PoP system 146 may determine the UT 108 that the downstream data 142 is addressed to and determine first communication resource data. The first communication resource data specifies the communication resources, such as the gateway 106, uplink modem at the gateway 106, satellite 102, downlink modem on the satellite 102, and so forth that would result in delivery of the downstream data 142 to the UT 108. The downstream data 142 may comprise a single packet or other unit of data transfer, or a plurality of packets or other units of data transfer that are associated with delivery to the particular UT 108.

In some implementations, traffic associated with a particular UT 108, such as a UT 108(T), may be routed through a single network point, such as a master PoP, firewall, traffic shaper, and so forth. Downstream data 142 received via one or more gateways 106 in different physical locations may be forwarded to a master PoP and processed before sending to the network 144. This processing may include removing or replacing packet header data, reordering packets, and so forth. The processing may serve to remove information that would otherwise indicate one or more of the particular gateway 106 or PoP system 146 that was used to receive the downstream data 142.

The downstream data 142 that is received by the PoP system 146 may be processed by a traffic shaper module 174 to determine, based at least in part on shaper input data 172, tokenized downstream data 176. Communication parameters such as specified frequencies and time slots associated with a downlink from a satellite 102 may be used to specify a set of resource blocks. Each resource block in the set is associated with a particular combination of parameters. Each resource block is representative of communication resources that may be used to transmit downstream data 142 from a satellite 102 to a UT 108. In one implementation, a set of resource blocks may be specified that designate the combinations of different frequencies and time slots that are associated with operation of a downlink transmitter. For example, each frequency may be associated with a particular sub-beam, with each sub-spot being served using one or more sub-beams. Sub-spots and sub-beams are discussed in more detail with regard to FIG. 3.

During operation, the traffic shaper module 174 determines a set of resource blocks that are associated with operation of a transmitter onboard a satellite 102. A first number of tokens may be determined. One token may be associated with each resource block in the set of resource blocks. In one example, there may be a one-to-one correspondence between resource blocks and tokens. In another example, there may be a one-to-many correspondence between resource blocks and tokens. The resource blocks are discussed in more detail with regard to FIG. 4.

Shaper input data 172 is determined that may include information such as buffer queue depth on the satellite 102, a round trip latency indicative of a delay associated with data transmission between the PoP system 146 where the traffic shaper module 174 is executing and the satellite 102, time until next handover from the current satellite 102(1) to a next satellite 102(2), and so forth. The shaper input data 172 is discussed in more detail with regard to FIG. 5.

The traffic shaper module 174 uses the shaper input data 172 to determine an allocated number of tokens. Portions of downstream data 142 may then be associated with tokens from the allocated number of tokens, producing tokenized downstream data 176. For example, each packet of downstream data 142 may be associated with a token. The tokenized downstream data 176 comprising the downstream data 142 that has an associated token is then forwarded to a gateway 106 that then sends the tokenized downstream data 176 to the satellite 102. Untokenized downstream data may be buffered for later tokenization and transmission or discarded.

The traffic shaper module 174 may be operated in different operating modes. Each operating mode may be associated with a different maximum number of tokens. For example, the number of resource blocks may be multiplied by a mode factor to determine a maximum number of tokens. The mode factor may vary by mode. The maximum number of tokens may then be adjusted, such as based on the shaper input data 172, to determine the allocated number of tokens.

While operating the traffic shaper module 174 in a scheduler mode, a relatively small mode factor is used, resulting in a relatively small maximum number of tokens. For example, the mode factor may equal 1. Because of the small maximum number of tokens, a limited amount of downstream data 142 is sent to the satellite 102. As a result, the transmit scheduler 178 onboard the satellite 102 has a relatively small amount of downstream data 142 to schedule.

In comparison, while operating the traffic shaper module 174 in a data pipe mode, a relatively large mode factor is used, resulting in a relatively large maximum number of tokens. For example, the mode factor may equal 1000. As a result, the transmit scheduler 178 onboard the satellite 102 has a relatively large amount of downstream data 142 to schedule.

In some implementations the operating mode or mode factor may be determined based on time until a handover. At handover, communication service for a particular UT 108 is transitioned to another sub-spot served by the satellite 102, spot served by the satellite 102, or satellite 102. As the handover approaches, the mode factor may decrease, transitioning from data pipe mode to scheduler mode.

The traffic shaper module 174 may also take into consideration other information. For example, different UTs 108 may be associated with different quality of service (QOS) priorities. In some implementations the allocation of tokens to downstream data 142 may be based on these priorities. For example, downstream data 142 addressed to a UT 108(1) that is associated with a hospital having high priority may be allocated tokens before downstream data 142 addressed to a UT 108(2) that is associated with a low priority.

Onboard the satellite 102, the transmit scheduler 178 may use the tokens to determine how and when the associated portion of data is to be transmitted on the downlink. In implementations in which a token represents a particular resource block, the transmit scheduler 178 may use the token to schedule transmission at the frequency and time slot specified by that resource block.

Figure 6:
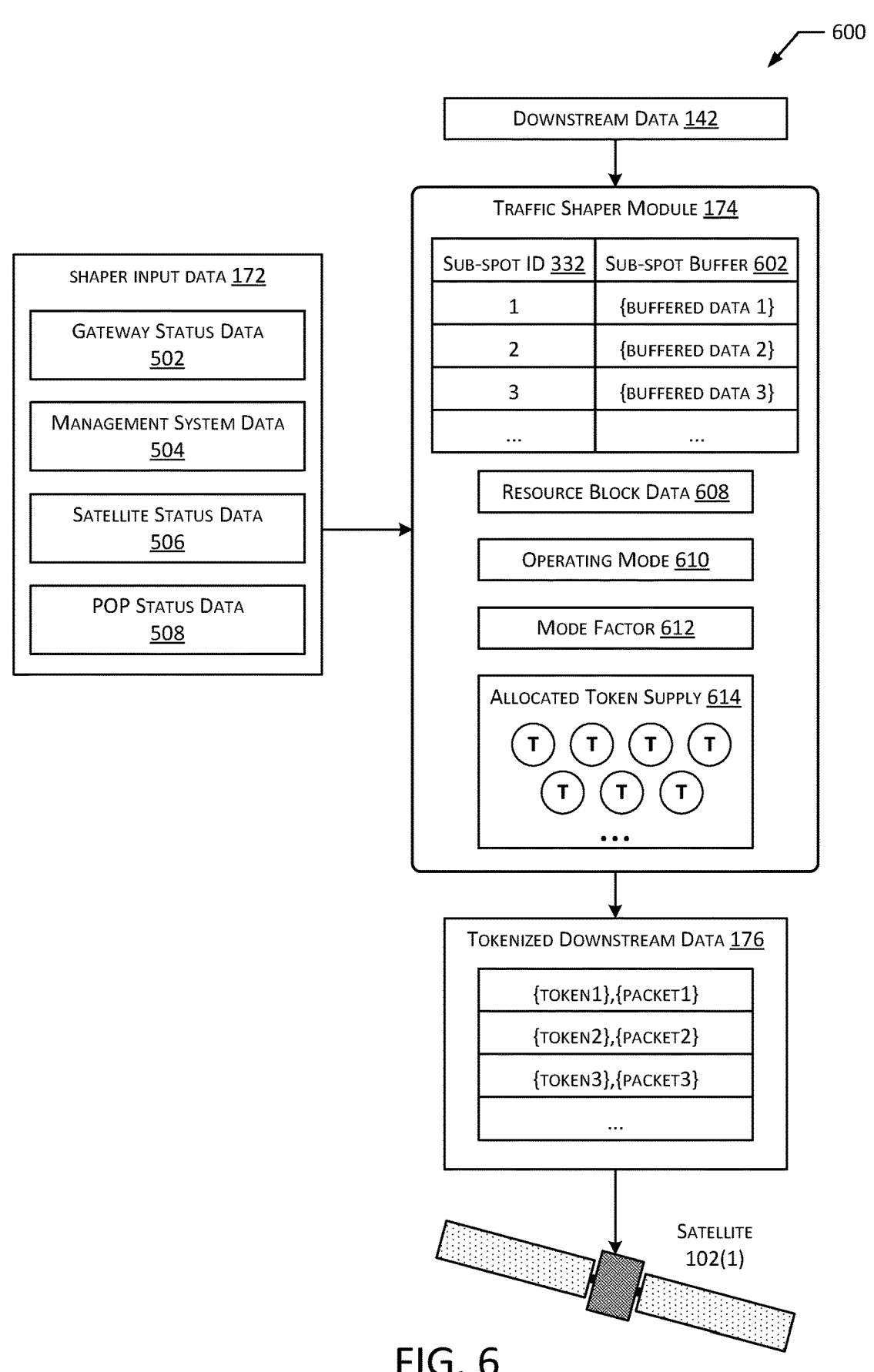
FIG. 6 depicts a traffic shaper module and associated inputs, according to some implementations.

Operation of the traffic shaper module 174 is discussed in more detail with regards to FIGS. 6-8.

The satellite 102, the gateway 106, the user terminal 108, the computing device 110, the management system 150, the PoP system 146, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks 144. For example, the transitory machine-readable signal may comprise transmission of software by the Internet.

One or more servers 134 or other computing devices may be connected to the one or more networks 144. The servers 134 may provide various services such as video call communications, streaming video, serving web pages, and so forth.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 212. A pulse per second (PPS) system 214 may be used to provide timing reference to the systems onboard the satellite 102. One or more buses 216 may be used to transfer data between the systems onboard the satellite 102. In some implementations, redundant buses 216 may be provided. The buses 216 may include, but are not limited to, data buses such as Controller Area Network Flexible Data Rate (CAN FD), Ethernet, Serial Peripheral Interface (SPI), and so forth. In some implementations the buses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 212. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a gateway 106, send telemetry to the gateway 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellent. For example, an electrothermal thruster may use water as propellent, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations, the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 212 provides communication with one or more other devices, such as other satellites 102, gateways 106, user terminals 108, and so forth. The communication system 212 may comprise one or more processors 292 to execute instructions. The communication system 212 may comprise a link module 268 and the transmit scheduler 178. In one implementation, the link module 268 may comprise an antenna 282 such as a phased antenna array (PAA) that is capable of simultaneously providing multiple sub-beams or gain patterns in different directions. A spot may comprise a particular sub-beam that is targeted to cover a specified portion of the Earth (see FIG. 3) while the satellite 102 is in a particular portion of the orbit 104. In one implementation, the link module 268 may adjust or steer the direction of the sub-beam relative to the satellite 102 to keep the sub-beam pointed at a target location on the Earth while the satellite 102 is above the horizon and in range of that target location. As the satellite 102 moves out of range of the target location, the sub-beam may be retargeted to another target location that is moving into range. The different sub-beams on the satellite 102 may be directed to different spots. In another implementation, the sub-beam may continuously sweep across the surface of the Earth, such as in a line parallel to a ground track of the satellite 102.

The communication system 212 may include one or more modems 276, digital signal processors, power amplifiers, antennas (including at least one antenna that implements multiple antenna elements, such as a phased antenna array) 282, processors 292, memories, storage devices, communications peripherals, interface buses 216, and so forth. Such components support communications with other satellites 102, gateways 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 212 may be output to other systems, such as to the control system 204, for further processing. Output from a system, such as the control system 204, may be provided to the communication system 212 for transmission. The modems 276 operate in conjunction with other components, such as receivers, transmitters, and one or more antennas 282 to one or more of send or receive data.

Each satellite 102 may use one or more antennas 282 or antenna elements to provide a beam for transmission and reception of radio signals. For example, the satellite 102 may have a phased antenna array that allows for gain in a particular direction, producing an antenna gain pattern. Compared to a non-directional radiator, this gain directs the energy of transmitted radio frequency signals in that particular direction. This increases the strength of the signal at a receiver in the UT 108, gateway 106, and so forth. Likewise, the gain results in improved received signal strength at the satellite 102.

The beam provided by the satellite 102 may comprise a plurality of sub-beams. Sub-beams on a satellite 102 may use different frequencies, timeslots, and so forth, to communicate with the UT 108. Each sub-beam provides coverage of a particular spot comprising a geographic area. Compared to a single beam, sub-beams provide several advantages. For example, by using sub-beams, radio frequencies may be reused by the same satellite 102 and other satellites 102 to service different areas. This allows increased density of UTs 108 and bandwidth.

During a pass over of a particular location on the Earth, each sub-beam may be targeted to a geographic location on the Earth. While that target spot is in range of the satellite 102, the sub-beam tracks the target spot. As the satellite 102 moves in orbit 104, the boundary of the footprint of the sub-beam on the surface changes due to the relative angle between the satellite 102 and the Earth. For example, the footprint boundary of the sub-beam may change from approximately an oval shape while the satellite 102 is low on the horizon relative to the target location, to a circular shape while directly overhead, then to an oval shape as the satellite 102 nears the opposite horizon. As the satellite 102 moves, a sub-beam may be retargeted to another target location. In this configuration, instead of the sub-beam sweeping along the ground track of the satellite 102, the sub-beam loiters on a first area relative to the Earth, then is redirected to a second area.

In some implementations, a particular modem 276 or set of modems 276 may be allocated to a particular sub-beam and the corresponding spot. For example, a first modem 276(1) provides communication to UTs 108 in a first spot using a first sub-beam while a second modem 276(2) provides communication to UTs 108 in a second spot using a second sub-beam.

In some implementations, the communication system 212 may include hardware to support the intersatellite link 198. For example, an intersatellite link FPGA 270 may be used to modulate data that is sent and received by an ISL transceiver 272 to send data between satellites 102. The ISL transceiver 272 may operate using radio frequencies, optical frequencies, and so forth.

A communication FPGA 274 may be used to facilitate communication between the satellite 102 and the gateways 106, UTs 108, and so forth. For example, the communication FPGA 274 may direct operation of a modem 276 to modulate signals sent using a downlink transmitter 278 and demodulate signals received using an uplink receiver 280. The satellite 102 may include one or more antennas 282. For example, one or more parabolic antennas may be used to provide communication between the satellite 102 and one or more gateways 106. In another example, a phased antenna array may be used to provide communication between the satellite 102 and the UTs 108.

The communication system 212 may determine one or more of handover data 164 or grant data. For example, the handover data 164 may be determined by the communication system 212 for an intrasatellite handover that specifies the spot to hand over to and parameters associated with using that spot. In another example, the grant data may be determined that specifies uplink resources for a UT 108 to communicate with the satellite 102. For example, the communication FPGA 274 may process a grant request that is received from a UT 108 by the uplink receiver 280. Responsive to the grant request, and subject to the transmit scheduler 178, the communications FPGA 274 may determine grant data that is then sent using the downlink transmitter 278. In another example, the transmit scheduler 178 may determine grant data without a grant request.

FIG. 3 illustrates at 300 sub-beams and sub-spots of a satellite's downlink, according to some implementations.

A spot may comprise a geographic area on the Earth and the airspace or volume corresponding with that geographic area that is provided with communication services. The spot may be subdivided into sub-spots 302(1), 302(2), . . . , 302(S). Each sub-spot 302 comprises a geographic area within the spot.

One or more UTs 108 may be present within respective sub-spots 302. For example, sub-spot 302(1) may have two UTs 108 within its border while sub-spot 302(19) (not shown) may have fifty UTs 108 within its border.

The geographic areas associated with the sub-spots 302 (1), 310(2), . . . , 302(S) may be arranged to cover at least a portion of a surface, physical area such as a portion of the sky, and so forth. For example, the Earth may be tessellated into geographic areas that are hexagonal or some other space-filling polygon arrangement. In some implementations, the geographic areas of the sub-spot 302 may be sized to correspond to the signal footprint of a sub-beam 310. For example, the sub-spot 302 may be based on the signal footprint or area on the surface of the Earth that corresponds to signal coverage at a specified metric such as signal to noise level or received power of an uplink sub-beam and a downlink sub-beam. In implementations in which the sub-spots 302 are directed towards space, each sub-spot 302 is associated with a respective physical area such as a solid angle of the sky, portion of an orbit 104, and so forth.

Also shown are sub-beams 310. A sub-beam 310 may be associated with a specified transmit frequency, modulation/ coding (mod/cod) scheme, and so forth. As a result, different sub-beams 310 may provide different bandwidth. For example, sub-beam 310(1) may use frequency F1, sub-beam 310(2) may use frequency F2, and so forth. Continuing the example, sub-beam 310(1) that is serving a sub-spot 302(1) experiencing heavy rain may use a low bitrate mod/cod to compensate for rain fade while sub-beam 310(3) that is serving a sub-spot 302(2) in clear weather may use a high bitrate mod/cod. One or more sub-beams 310 may be directed towards a particular sub-spot 302 to provide communication service. Multiple sub-beams 310 may be used to provide additional downlink bandwidth to a particular sub-spot 302 and the UTs 108 within that sub-spot 302. For example, two relatively low throughput 312 sub-beams 310(1) and 310(2) are depicted as serving sub-spot 302(1) while a single high throughput 314 sub-beam 310(3) serves subs-spot 302(2).

Also depicted is a table that illustrates information at the satellite 102 that may be used by the transmit scheduler 178. The table includes a sub-spot identifier (ID) 332 indicative of a particular sub-spot 302, contents of a buffer 334, a mod/cod index 336 that is indicative of the particular modulation/coding scheme used for a particular sub-spot 302 or individual UT 108 within a particular sub-spot 302, and resource block (RB) equivalents 338 indicative of a number of resource blocks that are associated with sending the current buffer 334 contents. The buffer 334 may be associated with a sub-spot 302, individual UTs 108 within the sub-spot 302, and so forth. The resource blocks are discussed in more detail with regard to FIG. 4.

FIG. 4 illustrates at 400 resource blocks 422, according to some implementations.

Depicted is a representation of a plurality of resource blocks 422(1), 422(2), . . . , 422(B). In this representation, the downlink communication parameters are time slot 402 and sub-beam 310. A horizontal axis depicts different time slots 402. Each time slot 402 is associated with one time interval used by the traffic shaper module 174 to allocate tokens. For example, this time interval may be deemed a "pacing interval". Each pacing interval may comprise a plurality of time slots 402. A vertical axis depicts different sub-beams 310. As mentioned with regard to FIG. 3, each sub-beam 310 may be associated with a different downlink frequency.

Each resource block 422 is associated with a particular combination of downlink communication parameters. The downlink communication parameters represent communication resources that may be used to transmit downstream data 142 from a satellite 102 to a UT 108. In other implementations the resource blocks 422 may be specified with respect to other downlink communication parameters such as specified antenna array, mod/cod, geographic area, and so forth.

FIG. 5 illustrates at 500 the shaper input data 172, according to some implementations. The shaper input data 172 is used by the traffic shaper module 174 to determine tokenized downstream data 176.

The shaper input data 172 may comprise gateway status data 502, management system data 504, satellite status data 506, and POP status data 508. In other implementations, other data may be used by the traffic shaper module 174.

The gateway status data 502 comprises information about the status of operation of the gateway 106. The gateway status data 502 may comprise one or more of mod/cod per gateway link 520, gateway queue depth data 522, and so forth. The mod/cod per gateway link 520 is indicative of the modulation and coding scheme used for the uplink from the gateway 106 to a specified satellite 102. The gateway queue depth data 522 is indicative of a quantity of data currently awaiting transmission from the gateway 106 to the specified satellite 102.

The management system data 504 comprises information associated with or determined by operation of the management system 150. The management system data 504 may comprise one or more of the following.

A satellite to UT (SAT-UT) time of flight latency 532 is indicative of a latency (time) associated with data transfer from the specified satellite 102 to a specified UT 108. A handover time 534 is indicative of a time at which a handover is scheduled to occur. The handover data 164 may comprise the handover time 534. UT to sub-spot association data 536 specifies which sub-spots 302 are associated with specified UTs 108. Sub-spot to transmit modem association data 538 indicates which transmit modems (and in some implementations associated transmitter) are associated with particular sub-spot(s) 302. Transmit modem to satellite association data 540 indicates which satellites 102 are associated with particular transmit modems (and in some implementations associated transmitters). Sub-beam to sub-spot assignment data 542 indicates which sub-beams 310 are associated with particular sub-spots 302. Gateway to satellite association data 544 indicates which gateways 106 are associated with particular satellites 102. Gateway to satellite time of flight latency 546 is indicative of a latency (time) associated with the propagation delay of a signal sent from the gateway 106 to the satellite 102.

The satellite status data 506 may comprise information indicative of operation of the satellite 102 or systems onboard, such as the communication system 212. The satellite status data 506 may comprise one or more of the mod/cod index 336, the buffer queue depth 572, intersatellite link availability 574, or other data. As described with regard to FIG. 3, mod/cod index 336 is indicative of the modulation/coding used on a downlink. For example, the mod/cod index 336 may be specified for each sub-beam 310. The buffer queue depth 572 is indicative of the data in a buffer that is to be sent via a downlink to a UT 108. The buffer queue depth 572 may be specified as bytes, packets, resource blocks 422, and so forth. The intersatellite link availability 574 is indicative of an ISL 196 that may be used to provide an alternative communication path to a gateway 106.

The POP status data 508 may comprise information indicative of operation of the POP system 146. The POP status data 508 may include estimated POP to gateway (POP-GW) latency data 580 that is indicative of the estimated latency from the POP system 146 to the gateway 106.

In some implementations the values of the shaper input data 172 may be calculated from other values. For example, the buffer queue depth 572 may be an average of a plurality of buffer queue depth values.

FIG. 6 depicts at 600 the traffic shaper module 174 and associated inputs, according to some implementations. The traffic shaper module 174 may execute at the POP system.

The traffic shaper module 174 accepts downstream data 142 and shaper input data 172 as input to process to determine tokenized downstream data 176. The downstream data 142 comprises data, such as packets, that are addressed to one or more UTs 108.

For ease of discussion, and not necessarily as a limitation, this disclosure uses the term "packet" in a non-limiting fashion. It is understood that the techniques and systems may be used with other protocol data units (PDUs) such as cells, media access control protocol data units (MPDU), other data transfer constructs, and so forth.

The traffic shaper module 174 may use the management system data 504 to determine which sub-spots 302 the downstream data 142 is associated with. For example, the destination address of the downstream data 142 may be resolved to a particular UT 108. Continuing the example, given the UT 108 and based on the UT to sub-spot associated data 536, the sub-spot 302 may be determined. Data that is associated with a particular sub-spot 302 may be accumulated in a sub-spot buffer 602.

The traffic shaper module 174 determines an allocated number of tokens based on resource block data 608. The allocated number of tokens are then used to tokenize at least a portion of the data in the sub-spot buffer(s) 602. During tokenization, a token is associated with a particular portion of data, such as a packet or other data transfer unit, resulting in tokenized downstream data 176.

The resource block data 608 is indicative of a number of resource blocks 422 that represent downlink communication parameters. As described with regard to FIG. 4 the number of resource blocks 422 may be determined by multiplying the number of sub-beams 310 with the number of time slots 402 for a scheduling interval.

The traffic shaper module 174 may be operated in different operating modes. An operating mode 610 may be determined. Each operating mode 610 may be associated with a different maximum number of tokens. For example, the number of resource blocks 422 may be multiplied by a mode factor 612 to determine a maximum number of tokens. The mode factor 612 may vary by mode. The maximum number of tokens may then be adjusted, such as based on the shaper input data 172, to determine a number of tokens in an allocated token supply 614. The adjustment made to determine the number of tokens in the allocated token supply 614 is discussed in more detail with regard to FIGS. 7 and 8. The allocated token supply 614 may be associated with one or more of a spot, sub-spot 302, UT 108, and so forth. For example, each sub-spot 302 may have a respective sub-spot 302 allocated token supply 614.

In some implementations the number of tokens in the allocated token supply 614 may be augmented using tokens from a subsequent time interval. For example, to accommodate a burst of downstream data 142 that would otherwise exceed the number of available tokens and be discarded, tokens associated with a later time may be added to the allocated number of tokens and used. The tokens that were used are removed from the allocated token supply 614 associated with the subsequent time interval.

In some implementations the operating mode 610 or mode factor 612 may be determined based on time until a next handover. At handover, communication service for a particular UT 108 is transitioned to another sub-spot 302 served by the satellite 102, spot served by the satellite 102, or satellite 102. As the handover approaches, the mode factor 612 may decrease, transitioning from data pipe mode to scheduler mode. The transition from one operating mode 610 or particular mode factor 612 value to another may be incrementally time-varying or stepwise. For example, a first function may decrease in a linear fashion the mode factor 612 as the time to handover decreases. In another example, at a specified time before handover the traffic shaper module 174 may transition from a first mode factor 612 to a second mode factor 612.

In other implementations the operating mode 610 or mode factor 612 may be determined based on other factors. For example, in the event the satellite 102 experiences a failure of an onboard processor that is executing the transmit scheduler 178, the operating mode 610 may be transitioned to the scheduler mode. In another example, the availability of an intersatellite link 196 may be used to determine the operating mode 610. Continuing this example, if an intersatellite link 196 with sufficient bandwidth is available to provide communication across a handover, the operating mode 610 may be set to the data pipe mode.

While operating the traffic shaper module 174 in a scheduler mode, a relatively small mode factor 612 is used, resulting in a relatively small maximum number of tokens. For example, the mode factor may equal 1. Because of the small maximum number of tokens, a limited amount of downstream data 142 is sent to the satellite 102. As a result, the transmit scheduler 178 onboard the satellite 102 has a relatively small amount of downstream data 142 to schedule.

In comparison, while operating the traffic shaper module 174 in a data pipe mode, a relatively large mode factor 612 is used, resulting in a relatively large maximum number of tokens. For example, the mode factor 612 may equal 1000. As a result, the transmit scheduler 178 onboard the satellite 102 has a relatively large amount of downstream data 142 to schedule.

Once the allocated token supply 614 has been determined, individual tokens from the allocated token supply 614 may be associated with respective portions of the data in the sub-spot buffer(s) 602, producing tokenized downstream data 176. For example, a token may be allocated to each packet of buffered data in the sub-spot buffer 602.

The traffic shaper module 174 may apply one or more rules to allocate tokens. For example, data within the buffered data may be prioritized based on quality of service (QOS) data in a packet header, based on priority associated with a particular UT 108, and so forth. This prioritized data may then be tokenized.

The tokenized downstream data 176 is sent to a gateway 106 for transmission to the satellite 102. In comparison, downstream data 142 that is un-tokenized may remain in the sub-spot buffer(s) 602 or may be discarded.

The tokenized downstream data 176 may then be processed by the transmit scheduler 178. In one implementation, the transmit scheduler 178 may determine a transmit schedule based at least in part on the token. For example, in some implementations the tokens may be associated with particular resource blocks 422. The transmit scheduler 178 may use the token to allocate the associated packet to a particular sub-beam 310 and time slot 402. For example, if the token is associated with a resource block 422 specifying sub-beam 310(3) and time slot 402(4), the transmitter of the satellite 102 may be operated to transmit the associated packet using sub-beam 310(3) during time slot 402(4).

FIG. 7 depicts at 700 a flow diagram of a process to tokenize downstream data 142 and schedule the tokenized data for transmission on a downlink from a satellite 102, according to some implementations. The process may be implemented by one or more satellites 102, gateways 106, PoP systems 146, the management system 150, and so forth.

At 702 a set of downstream data 142 is determined. For example, the traffic shaper module 174 may receive a plurality of packets of downstream data 142.

At 704 a set of resource blocks 422 are determined that are associated with operation of a transmitter onboard a first satellite 102. In one implementation, each resource block 422 is associated with a specified frequency of a sub-beam 310 and a time slot 402. For example, the set of resource blocks 422 may comprise the product of the sub-beams 310 and time slots 402 that are associated with a time interval used by the traffic shaper module 174 to allocate tokens.

At 706 shaper input data 172 is determined. For example, gateway status data 502 may be received from the gateway 106, management system data 504 may be received from the management system 150, satellite status data 506 may be received from the satellite 102, and PoP status data 508 may be received from the PoP system 146.

At 708 an operating mode 610 may be determined. In one implementation, a first time at which communication with the first satellite 102 is scheduled to be handed over from the first gateway 106(1) to a second gateway 106(2) may be used to determine the operating mode 610. For example, the operating mode 610 may be determined based on a difference between when a next handover occurs and the current time. If the time until the next handover is less than a threshold amount, the operating mode 610 may be set to a scheduler mode. Otherwise, the operating mode 610 may be set to data pipe mode. In another implementation, the operating mode 610 may be determined based on satellite status data 506. For example, if the intersatellite link availability 574 indicates an intersatellite link 196 is available, the operating mode may be set to the data pipe mode.

The mode factor 612 may be determined based on the operating mode 610. In one implementation, the mode factor 612 may be retrieved from memory, such as from a lookup table that specifies a particular value for each operating mode 610. In another implementation, the mode factor 612 may be determined using a function. For example, a linear function may determine the mode factor 612 based on a time remaining until handover.

In some implementations operation 708 may be omitted.

At 710 an allocated number of tokens are determined. The allocated number of tokens are visualized in FIG. 6 as the tokens within the allocated token supply 614. The determination is based on the set of resource blocks 422, and in some implementations one or more of the shaper input data 172 or the operating mode 610. In one implementation the allocated number of tokens may comprise a maximum number of tokens, calculated as the number of resource blocks 422 multiplied by the mode factor 612 associated with the operating mode 610. In other implementations other information may be considered, resulting in the allocated number of tokens being less than the maximum number of tokens. This information allows the system 100 to respond to the dynamic changes associated with operation. The determination of the allocated number of tokens is discussed in more detail with regard to FIG. 8.

At 712 at least a first portion of the set of downstream data 142 is associated with respective ones of the allocated number of tokens. For example, packets in the sub-spot buffer 602 may be allocated tokens from the allocated number of tokens in a "first in, first out" (FIFO) manner. This results in tokenized downstream data 176 comprising tokens and their associated second portions of the at least the first portion of the set of downstream data 142. As described above, in some circumstances there may be more packets in the sub-spot buffer 602 than tokens in the allocated token supply 614. Untokenized data may remain in the sub-spot buffer 602 or may be discarded.

In some implementations, tokens may be allocated based on QoS or other priorities associated with particular UTs 108. For example, downstream data 142 that is associated with a high priority UT 108 may be preferentially associated with tokens from the allocated number of tokens.

At 714 the first portion of the set of downstream data 142 and associated respective ones of the allocated number of tokens are sent to the first satellite 102 via a first gateway 106. For example, the tokenized downstream data 176 is sent from the POP system 146 to the gateway 106 that is currently in communication with the satellite 102. In some implementations before handover, the POP system 146 may send tokenized downstream data 176 to a next gateway 106 that will be providing communication to another satellite 102 that is providing communication services to the sub-spot 302 after the handover.

At 716 a transmit schedule of the first portion of the set of downstream data 142 is determined based at least in part on the respective ones of the set of tokens. For example, the transmit scheduler 178 may receive the tokenized downstream data 176. The tokens in the tokenized downstream data 176 may be associated with particular resource blocks 422. The transmit scheduler 178 may then schedule the associated downstream data 142 for transmission using the resources indicated by the particular resource blocks 422.

At 718 the first portion of the set of downstream data 142 is sent based on the transmit schedule. For example, based on the output from the transmit scheduler 178, the transmitter of the satellite 102 is operated to transmit the downstream data 142 using the sub-beams 310 to the respective UTs 108.

Operations 702 through 714 may be performed by the POP system 146.

Operations 716 and 718 may be performed by the satellite 102.

FIG. 8 depicts at 800 a flow diagram of a process to determine a number of tokens to use by the traffic shaper module 174, according to some implementations. The process may be implemented by one or more satellites 102, gateways 106, POP systems 146, the management system 150, and so forth. The process depicted takes into consideration the latencies associated with operation of the system. For example, the system may consider the time of flight delays associated with sending tokens and associated data from the traffic shaper module 174 to the satellite 102, the time of flight delays associated with sending satellite status data 506 from the satellite 102 back to the traffic shaper module 174, and so forth.

At 802 a first number of tokens is determined. The first number of tokens is determined based on the set of resource blocks 422 available. As described above, each token is associated with a respective resource block 422 of the set of resource blocks 422 of the first satellite 102. The first number of tokens may be deemed a "token bucket capacity".

At 804 a buffer queue depth 572 at the first satellite 102 for a specified time interval is determined. For example, the buffer queue depth 572 may be determined by the transmit scheduler 178.

At 806 a second number of tokens is determined based on the first number of tokens and the buffer queue depth 572. The buffer queue depth 572 may be expressed in resource blocks 422. The buffer queue depth 572 may be indicative of the number of resource blocks 422 needed to empty the SAT sub-spot buffer 334. This compensates for the difference between the estimated sub-spot 302 throughput compared to the actual achieved sub-spot 302 throughput.

In some implementations other information may also be used to determine the second number of tokens. For example, the determination may be based at least in part on the estimated POP to gateway latency data 580. This compensates for a timing-induced variance in the actual status of the SAT sub-spot buffer 334 that results from the latency between the satellite 102 and the POP system 146. For example, the satellite 102 sends the buffer queue depth 572 information, and that information takes some time to reach the traffic shaper module 174. This compensation may also take into consideration the burstiness of the downstream data 142.

In some implementations, the second number of tokens may be determined using the following algorithm:

Receive the buffer queue depth.

Determine quantity of data sent to the satellite in the last x millisecond, where x is a time to take a round trip between the POP system and the satellite (SAT).

Determine an estimated queue depth on satellite at the slot when all the tokens that have been reach the satellite:

adjustedQueuedepthOnSAT=queueDepth  feedback from SAT;

for t=1:2*SvToKPoPDelay adjustedQueueDepthOnSAT=adjustedQueuedepthOnSAT+ Token sent (max(1, end−(2*SATtoPoPDelayMs− t)));

if adjustedQueueDepthOnSAT>0 adjustedQueueDepthOnSAT=adjustedQueuedepthOnSAT− estimated drain rate in the corresponding time slot;

end end

Adjusted number of tokens for this slot=token bucket capacity  adjustedQueueDepthOnSAT.

Algorithm 1

At 808 an estimated token drain rate is determined. The estimated token drain rate may be determined using the following algorithm:

Let R_m(t) denote the drain rate for time slot t for m-th sub-spot. Number of resource blocks sent by transmit scheduler for this sub-spot per pacing interval of the traffic shaper module.

Algorithm 2

At 810 a third number of tokens are determined based on the second number of tokens and the estimated token drain rate. The third number of tokens may be determined using the following algorithm:

$T\_m(t)=\min$ (bucket size, T_m(t−1)+R_m(t)), where m is the m-th sub-spot.

Algorithm 3

At 812 an operating mode 610 may be determined. For example, the operating mode 610 may be determined as described above with regard to 708. In some implementations operation 812 may be omitted.

At 814 a fourth number of tokens are determined based on the third number of tokens and the operating mode 610. The fourth number of tokens may be determined using the following algorithm:

Step 1: Estimate how much time (denoted as Time_To-_ClearOut_buffer_On_SAT ms) it takes for first SAT to clear out all the data already sent to first SAT for this sub-spot. Note that this includes both the data already on the first SAT and the data on the way to first SAT.

Step 2: Check how much time (denoted as Time_Till-_HO_Execution ms) from now till handover (HO) execution happens.

Step 3: Estimate the time available to send data to first SAT (alternatively the time that first SAT has to transmit further data before HO execution time) as Time_Till_HO_Execution—Time_To_ClearOut_buffer_On_SAT—POP-GW delay—GW-SAT delay— reserve extra margin.

Note that the data sending from traffic shaper at this moment will arrive at SAT (POP-GW delay+GW-SAT delay) later. As a result, POP-GW delay and GW-SAT delay are subtracted. For example, if the current data on the first SAT takes 5 ms to clear out, and from now until the HO execution is 20 ms. If PoP-GW delay+GW-SAT delay=8 ms, then the data the traffic shaper module sends out at this time instance will not reach SAT till 8 ms later. Thus, the first SAT will only have 12 ms from the time it arrives at SAT till the HO execution.

Extra margin is added to accommodate any mismatch between the estimated time and the actual time used to clear out the buffer. This is caused by the difference on the estimated drain rate at POP and the actual sent rate on first SAT.

Step 4: Adjust the number of tokens based on the result in step 3. In some implementations this number of tokens is less than the number of resource blocks in the allowed time (ms).

Step 5: If the estimated time available in Step 3 becomes zero or negative, then, the traffic shaper module stops forwarding data to first SAT. Instead, the traffic shaper module will start forwarding data to second SAT that will be providing communication service after the HO.

Step 6: If the traffic shaper module determines to start forwarding data to second SAT, reset the number of tokens to be equal to the token bucket capacity on the second SAT. Note that since data is forwarded to second SAT before the HO execution time, the second SAT is unable to send downstream data immediately. As a result, the estimated drain rate on the second SAT is set to zero until the second SAT starts to serve this sub-spot.

Algorithm 4

In some implementations, the fourth number of tokens may be used as the allocated number of tokens.

At 816 gateway capacity associated with communication to the first satellite 102 may be determined. This allows the traffic shaper module 174 to take into consideration the gateway 106 to satellite 102 uplink and adjust for situations such as a burst of data that may exceed the capacity of the uplink. In some implementations the following algorithm may be used to determine the gateway capacity:

Let G denote the gateway capacity, i.e., the number of bytes the gateway can be sent to SV at this slot.

Let M denote the number of sub-spots connected with same SAT, and thus are connected using the same gateway.

Let W_m denote the weight associated with sub-spot m. This weight is assigned based on the bandwidth of sub-spots.

Then, for sub-spot m, the assigned data quota for SAT-GW link is:

$GW\_m=W\_m*G/sum(W\_i)$

Note that for handover the traffic shaper module may if an upcoming handover will introduce an additional transmit delay from the POP to the GW. In this situation, the traffic shaper module may stop forwarding data to the first GW and start forwarding to the second GW before the actual HO execution time at the first GW.

Algorithm 5

At 818 a fifth number of tokens are determined based on the fourth number and the gateway capacity. For example, the assigned data quota for the SAT-GW link may be expressed as tokens. In one implementation the fifth number may be determined using the following algorithm.

Calculate the assigned data quota for the SAT-GW link (gateway capacity).

Calculate r number of resource blocks associated with the assigned data quota.

If the fourth number is >the assigned data quota, then the fifth number=assigned data quota.

Else the fifth number=the fourth number.

Algorithm 6

In some implementations additional operations may be performed. (Not shown.)

An operation may distribute the allocated tokens to UTs 108 for each sub-spot 302. An implementation is described in the following algorithm:

Step 1: n=max (Qos_i), i=1 . . . . N the active UT list served in this sub-spot. Qos is a quality of service metric. Active UTs may be defined as the UTs having downstream data addressed thereto during the pacing interval.

Step 2: Assign token to this UT_n per packet and update QoS weight after each packet assignment. Update sub-spot level token after each assignment.

Note that sub-spot level token is updated using (token assigned to this UT_n)/(number of bytes transmitted per resource block for this UT). The number of bytes transmitted per resource block depends on each UT's respective mod/cod.

Step 3: repeat Step 1 until no active UT in this sub-spot or sub-spot level token is zero.

Algorithm 7

An additional operation may distribute any remaining data quota among sub-spots 302 associated with the same satellite 102 to account for constrained gateway 106 links. An implementation is described in the following algorithm:

Step 1: For each satellite, sum up the assigned tokens per UT and determine data quota still remaining for gateway link.

Step 2: Determine unassigned tokens.

Step 3: Redistribute the unassigned tokens among spots serviced by the satellite. This redistribution may be performed equally, may be based onto Qos requirements, and so forth.

Step 4: Perform the operations discussed with regard to Algorithm 7.

Step 5: Return to step 1 until no data quota left for this SAT-GW link or no active UTs for the sub-spots.

Algorithm 8

Times, intervals, durations, and the like as used in this disclosure may be specified with respect to actual clock time, system time, system timing references, discrete timeslots or interval indicators, and so forth. For example, time ticks may be specified relative to an epoch that resets at 10-minute intervals. In another example, actual clock time obtained from a GNSS receiver may be used to coordinate operation of one or more elements of the system 100.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:

a first set of one or more processors executing instructions to:

determine downstream data;

determine a set of resource blocks associated with a transmitter onboard a first satellite, wherein each resource block is associated with a specified frequency and time slot;

determine shaper input data;

determine, based on the set of resource blocks and the shaper input data, an allocated number of tokens;

associate a first portion of the downstream data with one of the allocated number of tokens; and send the first portion of the downstream data and associated one of the allocated number of tokens to the first satellite; and the first satellite comprising a second set of one or more processors executing instructions to:

receive the first portion of the downstream data and the one of the allocated number of tokens; and schedule transmission of the first portion of the downstream data on a downlink based at least in part on the one of the allocated number of tokens.

2. The system of claim 1, further comprising instructions that when executed by the first set of one or more processors, cause the system to:

determine buffer queue depth data indicative of a time to empty a buffer on the first satellite that stores at least a second portion of the first portion of the downstream data; and determine round trip latency data associated with data transmission between the system and the first satellite;

wherein the shaper input data comprises the buffer queue depth data and the round trip latency data.

3. The system of claim 1, further comprising instructions that when executed by the first set of one or more processors, cause the system to:

determine a first time at which communication with the first satellite is scheduled to be handed over from a first gateway to a second gateway; and before the first time, send the first portion of downstream data and the one of the allocated number of tokens to the second gateway.

4. The system of claim 1, further comprising instructions that when executed by the first set of one or more processors, cause the system to:

determine a first number of tokens associated with respective resource blocks of the set of resource blocks, wherein the first number of tokens have been sent to the first satellite during a specified time interval;

determine a first user terminal associated with part of the first portion of the downstream data;

determine a first time at which communication between the first satellite and the first user terminal is scheduled to be handed over from the first satellite to a second satellite; and wherein the allocated number of tokens is determined based on the first number of tokens and the first time.

5. The system of claim 1, further comprising instructions that when executed by the first set of one or more processors, cause the system to:

determine a first time at which communication with the first satellite is scheduled to be handed over from a first gateway to a second gateway; and wherein the allocated number of tokens is determined based at least in part on the first time.

6. The system of claim 1, further comprising instructions that when executed by the first set of one or more processors, cause the system to:

determine a first number of tokens, wherein each token of the first number of tokens is associated with a respective resource block of the set of resource blocks;

determine a buffer queue depth at the first satellite for a specified time interval;

determine a second number of tokens based on the first number of tokens and the buffer queue depth;

determine an estimated token drain rate indicative of a number of previously received tokens that have been sent by the first satellite during the specified time interval;

determine a third number of tokens based on the second number of tokens and the estimated token drain rate; and determine an operating mode indicative of a scheduler mode or a data pipe mode;

wherein the allocated number of tokens is determined based on the third number of tokens and the operating mode.

7. The system of claim 1, further comprising instructions that when executed by the first set of one or more processors, cause the system to:

determine an operating mode; and wherein the allocated number of tokens is determined based on the operating mode.

8. A method comprising:

determining downstream data;

determining a set of resource blocks associated with a transmitter onboard a first satellite, wherein each resource block is associated with a specified frequency and time slot;

determining shaper input data;

determining, based on the set of resource blocks and the shaper input data, an allocated number of tokens;

associating a first portion of the downstream data with one of the allocated number of tokens;

determining buffer queue depth data indicative of a time to empty a buffer on the first satellite that stores at least a second portion of the first portion of the downstream data; and determining round trip latency data associated with data transmission between a first set of one or more processors and the first satellite;

wherein the shaper input data comprises the buffer queue depth data and the round trip latency data.

9. The method of claim 8, further comprising:

sending the first portion of the downstream data and the one of the allocated number of tokens to the first satellite via a first gateway; and scheduling, at the first satellite, transmission of the first portion of the downstream data on a downlink based at least in part on the one of the allocated number of tokens.

10. The method of claim 8, further comprising:

determining a first time at which communication with the first satellite is scheduled to be handed over from a first gateway to a second gateway; and before the first time, sending the first portion of the downstream data and the one of the allocated number of tokens to the first satellite via the second gateway.

11. The method of claim 8, further comprising:

determining a first number of tokens associated with respective resource blocks of the set of resource blocks, wherein the first number of tokens have been sent to the first satellite during a specified time interval;

determining a first user terminal associated with part of the first portion of the downstream data; and determining a first time at which communication between the first satellite and the first user terminal is scheduled to be handed over from the first satellite to a second satellite;

wherein the determining the allocated number of tokens is based on the first number of tokens and the first time.

12. The method of claim 8, further comprising:

determining a first time at which communication with the first satellite is scheduled to be handed over from a first gateway to a second gateway; and wherein the determining the allocated number of tokens is based at least in part on the first time.

13. The method of claim 8, further comprising:

determining a first number of tokens, wherein each token of the first number of tokens is associated with a respective resource block of the set of resource blocks;

determining a second number of tokens based on the first number of tokens and the buffer queue depth data;

determining an estimated token drain rate indicative of a number of previously received tokens that have been sent by the first satellite during a specified time interval;

determining a third number of tokens based on the second number of tokens and the estimated token drain rate; and determining an operating mode indicative of a scheduler mode or a data pipe mode;

wherein the determining the allocated number of tokens is based on the third number of tokens and the operating mode.

14. The method of claim 8, further comprising:

determining an operating mode; and wherein the determining the allocated number of tokens is based on the operating mode.

15. A method comprising:

determining a set of resource blocks associated with a first satellite, wherein each resource block is associated with a specific combination of two or more downlink communication parameters;

determining shaper input data;

determining a first time at which communication with the first satellite is scheduled to be handed over from a first gateway to a second gateway;

determining, based on the set of resource blocks and the shape input data, an allocated number of tokens;

associating a first portion of downstream data with one of the allocated number of tokens; and before the first time, sending the first portion of the downstream data and the one of the allocated number of tokens to the first satellite via the second gateway.

16. The method of claim 15, further comprising:

scheduling, at the first satellite, transmission of the first portion of the downstream data on a downlink based at least in part on the associated one of the allocated number of tokens.

17. The method of claim 15, further comprising:

determining buffer queue depth data indicative of a time to empty a buffer on the first satellite that stores at least a second portion of the first portion of the set of the downstream data; and determining round trip latency data associated with data transmission between a first set of one or more processors and the first satellite; and wherein the shaper input data comprises the buffer queue depth data and the round trip latency data.

18. The method of claim 15, further comprising:

determining a first number of tokens associated with respective resource blocks of the set of resource blocks, wherein the first number of tokens have been sent to the first satellite during a specified time interval;

determining a first user terminal associated with part of the first portion of the downstream data; and determining a second time at which communication between the first satellite and the first user terminal is scheduled to be handed over from the first satellite to a second satellite;

wherein the determining the allocated number of tokens is further based on the first number of tokens and the second time.

19. The method of claim 15, further comprising:

determining a first number of tokens, wherein each token of the first number of tokens is associated with a respective resource block of the set of resource blocks;

determining a buffer queue depth at the first satellite for a specified time interval;

determining a second number of tokens based on the first number of tokens and the buffer queue depth;

determining an estimated token drain rate indicative of a number of previously received tokens that have been sent by the first satellite during the specified time interval; and determining a third number of tokens based on the second number of tokens and the estimated token drain rate;

wherein the determining the allocated number of tokens is based on the third number of tokens.

20. The method of claim 15, further comprising:

determining an operating mode; and wherein the determining the allocated number of tokens is based on the operating mode.

* * * * *